United States Patent
Saito

(10) Patent No.: US 9,042,875 B2
(45) Date of Patent: May 26, 2015

(54) VEHICULAR COMMUNICATION APPARATUS

(75) Inventor: Soichi Saito, Nagoya (JP)

(73) Assignee: DENSO CORPORATION, Kariya (JP)

( * ) Notice: Subject to any disclaimer, the term of this patent is extended or adjusted under 35 U.S.C. 154(b) by 145 days.

(21) Appl. No.: 13/614,437

(22) Filed: Sep. 13, 2012

(65) Prior Publication Data

US 2013/0078980 A1 Mar. 28, 2013

(30) Foreign Application Priority Data

Sep. 22, 2011 (JP) .................. 2011-207269

(51) Int. Cl.
| | | |
|---|---|---|
| H04M 3/00 | (2006.01) | |
| H04W 76/06 | (2009.01) | |
| H04W 84/12 | (2009.01) | |
| H04W 84/00 | (2009.01) | |
| H04W 4/02 | (2009.01) | |
| H04W 4/04 | (2009.01) | |
| H04W 48/18 | (2009.01) | |

(52) U.S. Cl.
CPC ............ *H04W 76/06* (2013.01); *H04W 84/005* (2013.01); *H04W 84/12* (2013.01); *H04W 4/027* (2013.01); *H04W 4/046* (2013.01); *H04W 48/18* (2013.01)

(58) Field of Classification Search
CPC ............ C08G 1/00; G01C 21/20; B60T 1/00; H04W 4/008; H04W 76/06; H04W 84/005; H04W 84/12; H04W 36/32; H04W 48/18; H04W 88/06; H04W 36/08; H04W 36/36; H04W 36/18; H04W 4/027; H04W 36/14; H04W 48/20; H04W 76/02; H04M 2250/12; H04M 2250/02; H04M 1/7253; H04M 1/6083; H04M 1/72527; H04M 1/6075; H04L 65/1083
USPC ......... 701/470; 345/156; 455/419, 3.06, 41.1, 455/41.2, 41.3, 345, 346, 569.1, 569.2, 455/575.9, 418, 525; 370/338
See application file for complete search history.

(56) References Cited

U.S. PATENT DOCUMENTS

| | | | |
|---|---|---|---|
| 6,970,703 B2 * | 11/2005 | Fuchs et al. ................. | 455/426.1 |
| 7,554,962 B2 * | 6/2009 | Takeuchi ....................... | 370/338 |

(Continued)

FOREIGN PATENT DOCUMENTS

| | | |
|---|---|---|
| JP | 2003-309865 | 10/2003 |
| JP | 2005-268933 | 9/2005 |

(Continued)

OTHER PUBLICATIONS

Office Action issued Jul. 23, 2013 in corresponding Japanese Application No. 2011-207269 (with English translation).

*Primary Examiner* — Olumide T Ajibade Akonai
(74) *Attorney, Agent, or Firm* — Harness, Dickey & Pierce, PLC

(57) ABSTRACT

A vehicular communication apparatus establishes, by a narrow area communication channel establishment unit, a narrow area communication channel to a cellular phone that is brought into a vehicle compartment, and establishes a wide area communication channel to an access point outside of a vehicle. Upon detecting a stop condition of the vehicle by using a stop detection unit, the vehicular communication apparatus disconnects the narrow area communication channel by using a narrow area communication channel disconnection unit.

6 Claims, 3 Drawing Sheets

(56) References Cited

U.S. PATENT DOCUMENTS

| | | | |
|---|---|---|---|
| 7,904,219 B1* | 3/2011 | Lowrey et al. | 701/32.3 |
| 2002/0177928 A1* | 11/2002 | Moriguchi et al. | 701/1 |
| 2007/0081506 A1 | 4/2007 | Yamada | |
| 2007/0265040 A1 | 11/2007 | Matsui | |
| 2008/0227434 A1 | 9/2008 | Nitta et al. | |
| 2009/0070038 A1* | 3/2009 | Geelen et al. | 701/216 |
| 2009/0177396 A1* | 7/2009 | Thomassen | 701/213 |
| 2009/0221275 A1* | 9/2009 | Trip | 455/418 |
| 2010/0052945 A1* | 3/2010 | Breed | 340/903 |
| 2010/0210212 A1* | 8/2010 | Sato | 455/41.3 |
| 2010/0216509 A1* | 8/2010 | Riemer et al. | 455/557 |
| 2011/0065375 A1* | 3/2011 | Bradley | 455/1 |
| 2011/0065456 A1* | 3/2011 | Brennan et al. | 455/456.4 |
| 2012/0030470 A1* | 2/2012 | Jdanov et al. | 713/176 |
| 2012/0041633 A1* | 2/2012 | Schunder et al. | 701/29.2 |
| 2012/0244883 A1* | 9/2012 | Tibbitts et al. | 455/456.2 |
| 2012/0330544 A1* | 12/2012 | Joong et al. | 701/408 |
| 2013/0038437 A1* | 2/2013 | Talati et al. | 340/438 |
| 2013/0295901 A1* | 11/2013 | Abramson et al. | 455/418 |

FOREIGN PATENT DOCUMENTS

| | | |
|---|---|---|
| JP | 2005-299199 | 10/2005 |
| JP | 2006-115098 | 4/2006 |
| JP | 2006-287321 | 10/2006 |
| JP | 2007-235841 | 9/2007 |
| JP | 2008-228131 | 9/2008 |
| JP | 2011-087026 | 4/2011 |
| JP | 2012-175686 | 9/2012 |
| WO | WO 2006/100714 | 9/2006 |

* cited by examiner

VEHICULAR COMMUNICATION APPARATUS

CROSS REFERENCE TO RELATED APPLICATION

The present application is based on and claims the benefit of priority of Japanese Patent Application No. 2011-207269, filed on Sep. 22, 2011, the disclosure of which is incorporated herein by reference.

TECHNICAL FIELD

The present disclosure generally relates to a vehicular communication apparatus that establishes a narrow area communication channel to a communication device brought into a vehicle compartment and a wide area telecommunication channel to an access point outside of the vehicle.

BACKGROUND

Conventionally, as disclosed in, for example, Japanese Patent Laid-Open No. 2006-287321 (JP '321) and Japanese Patent Laid-Open No. 2011-087026 (JP '026), a vehicular communication system that establishes a narrow area communication channel, such as a Bluetooth communication channel (Bluetooth: a registered trademark), to a cellular phone that is brought into the vehicle compartment is known.

Further, as disclosed in Japanese Patent Laid-Open No. 2003-309865 (JP '865) a wireless communication apparatus establishing a wide area communication channel to a wireless communication access point, or a so-called hot spot, at places such as a coffeehouse, a convenience store, a dealer, which are outside of a vehicle, is also known.

The communication standards for establishing a wide area communication channel, such as IEEE802.11b, IEEE802.11g, and IEEE802.11n, use a communication band of 2.4 GHz, which is also used for establishing a Bluetooth communication channel. Therefore, simultaneous use of two types of communication, that is, the wide area communication channel according to IEEE802.11b, IEEE802.11g, or IEEE802.11n and the narrow area communication channel by the Bluetooth standard, may require a work-out scheme, such as a separate/distant positioning of respective communication antennas, a time division communication control or the like.

However, such work-out scheme may lead to a deteriorated throughput of the wide area communication channel, due to the communication operation of the narrow area communication channel. More specifically, the wide area communication channel assumes a large amount of data communication to and from the access point, thereby making it necessary and urging for the communication apparatus, which is capable of establishing both of narrow and wide area communication channels, to prevent the throughput deterioration of the wide area communication channel caused by the communication operation of the narrow area communication channel.

SUMMARY

Communication with an access point outside of a vehicle through the wide area communication channel is efficiently performed, not at a time when the vehicle is temporarily approaching the access point or is stopping at the proximity of the access point, but at a time when the vehicle is stopping for a certain period of time. Therefore, in the present disclosure, the vehicle communication apparatus is configured to perform a control that prevents the throughput deterioration of the wide area communication channel, when the vehicle is stopping for a certain period of time.

In an aspect of the present disclosure, the vehicular communication apparatus establishes a narrow area communication channel to a communication device that is brought into a vehicle compartment by a narrow area communication channel establishing unit, and establishes a wide area communication channel to an access point outside of a vehicle by a wide area communication channel establishing unit. When the vehicular communication apparatus detects, by using a stop detection unit, that the vehicle has come to a stop or is in a stop condition, the apparatus disconnects the narrow area communication channel having been established by the narrow area communication channel establishing unit.

Such configuration allows the disconnection of the narrow area communication channel when the vehicle is stopped, which enables an efficient communication with the access point through the wide area communication channel, thereby preventing the throughput deterioration of the wide area communication channel due to the communication operation of the narrow area communication channel.

In addition to the above, the stop detection unit detects the stop of the vehicle when the vehicle is "parked." In such manner, when the vehicle continues to stop for a certain period of time, which is relatively long, a process to establish a wide area communication channel wirelessly to an access point existing outside of the vehicle and a process to prevent a throughput deterioration of the wide area communication channel by disconnecting the narrow area communication channel are both performed. Further, when the vehicle stops temporarily at a traffic signal or the like, that is, in other words, when the communication with the access point through the wide area communication, channel is not required, an unnecessary disconnection of the narrow area communication channel is prevented.

BRIEF DESCRIPTION OF THE DRAWINGS

Other objects, features and advantages of the present disclosure will become more apparent from the following detailed description disposed with reference to the accompanying drawings, in which.

DETAILED DESCRIPTION

An embodiment of the present disclosure is described in the following with, reference to the drawings.

Figure 1:
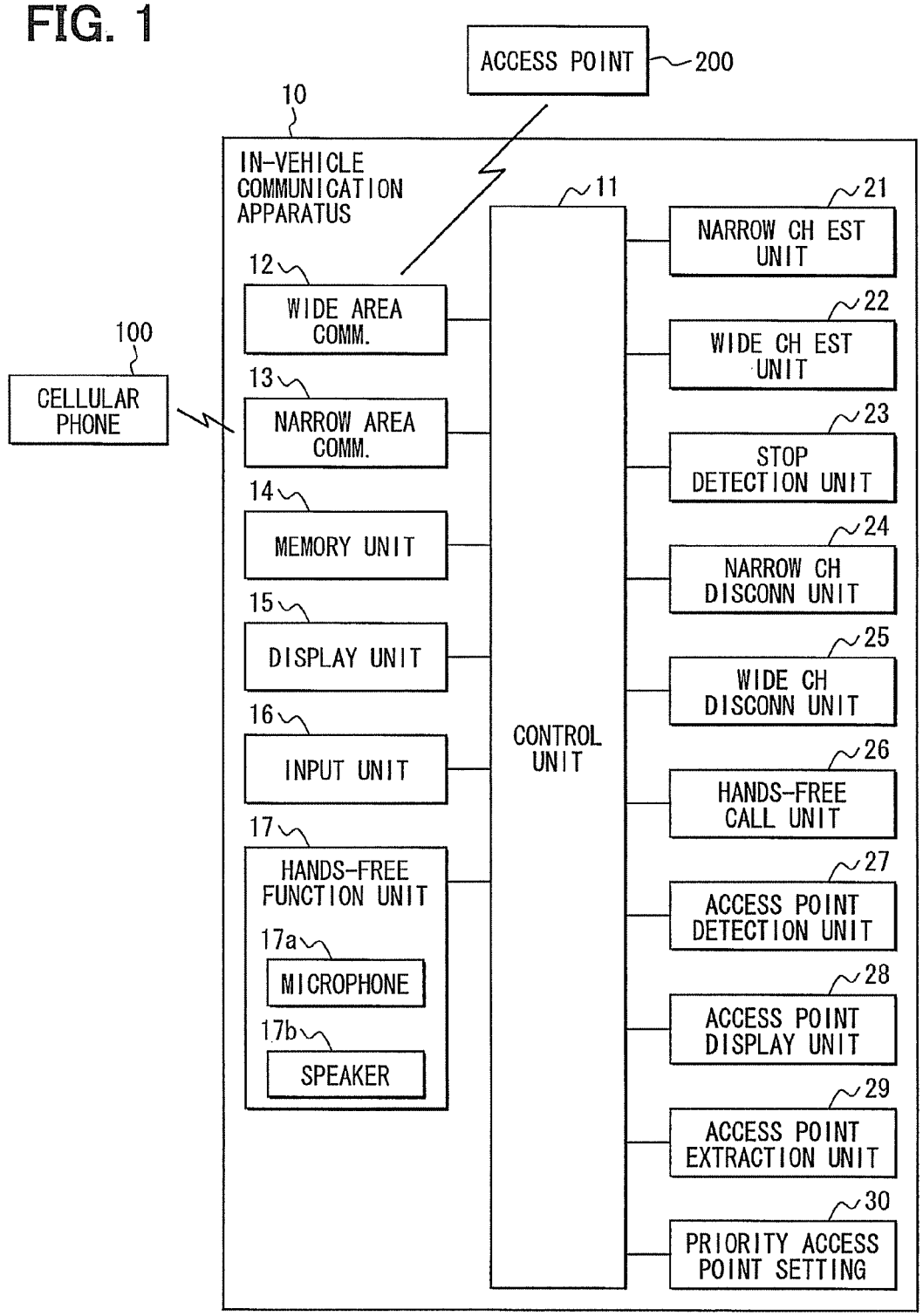
FIG. 1 is a block diagram of a vehicular communication apparatus of the present disclosure.

FIG. 1 is a block diagram of a vehicular communication apparatus 10 in an embodiment of the present disclosure. When a communication function of the apparatus 10 is set to "On," the vehicular communication apparatus 10 wirelessly establishes a narrow area communication channel to a communication device, such as a cellular phone 100, and, performs, for example, various kinds of operation, such as a hands-free call with a cellular phone 100, or exchanges various kinds of information.

Further, the vehicular communication apparatus 10 wirelessly establishes a wide area communication channel to an access point 200, i.e., a so-called hotspot outside or external of a vehicle at places such as, for example, a coffeehouse, a convenience store, an automobile dealer or the like. The vehicular communication apparatus 10 receives various information such as sound information and image information as well as traffic information including congestion information, construction information, and event information about events held around the vehicle. In brief, the vehicular communication apparatus 10 is a device that is capable of establishing both the narrow area communication channel and the wide area communication channel.

The vehicular communication apparatus 10 includes a control unit 11 that is provided as a microcomputer having a CPU, a ROM, a RAM and the like (not illustrated). The vehicular communication apparatus 10 further includes a wide area wireless communication unit 12, a narrow area wireless communication unit 13, a memory unit 14, a display unit 15, an operation input unit 16, and a hands-free function unit 17, which are respectively coupled to the control unit 11.

Further, the vehicular communication apparatus 10 via the control unit 11 virtually realizes as software, by the execution of a control program in the CPU the following units: a narrow area communication channel establishment unit 21 (i.e., NARROW CH. EST. in Figures), a wide area communication channel establishment unit 22 (i.e., WIDE CH. EST. in Figures), a stop detection unit 23, a narrow area communication channel disconnection unit 24 (i.e., a NARROW CH DISCONN UNIT in Figures), a wide area communication channel disconnection unit 25 (i.e., a WIDE CH DISCONN UNIT in Figures), a hands-free call placement unit 26 (i.e., HANDS-FREE CALL UNIT in Figures), an access point detection unit 27, an access point display unit 28, an access point extraction unit 29, and a priority point setting unit 30.

For brevity, the narrow area communication channel establishment unit 21 will be referred to as the narrow channel establishment unit 21; the wide area communication channel establishment unit 22 will be referred to as the wide channel establishment unit 22; the narrow area communication channel disconnection unit 24 will be referred to as the narrow channel disconnection unit 24; and the wide area communication channel disconnection 25 will be referred to as the wide channel disconnection 25 hereinafter.

The wide area wireless communication unit 12 is a communication module wirelessly establishing a wide area communication channel to the access point 200 outside of the vehicle. The vehicular communication apparatus 10 receives various kinds of information through the wide area communication channel from the access point 200. The wide area communication channel may be, for example, a Wi-Fi communication channel (Wi-Fi: a registered trademark).

The narrow area wireless communication unit 13 is a communication module wirelessly establishing a narrow area communication channel to a communication device such as the cellular phone 100 brought into the vehicle compartment. The vehicular communication apparatus 10 can transmit and receive various information to and from the cellular phone 100 through the narrow area communication channel. For example, the narrow area communication channel may be, for example, a Bluetooth communication channel (Bluetooth: a registered trademark). Further, as long as the wide area communication channel is a communication channel that is different from the narrow area communication channel, i.e., a Bluetooth communication channel in this case, the wide area communication, channel may be any communication channel. In other words, the communication channel, such as WAN or LAN may also be considered as the wide area communication channel.

The memory unit 14 is provided as, for example, a non-volatile storage medium such as hard disk drives. The control unit 11 stores, in the memory unit 14, various information received from the access point 200 via the wide area wireless communication unit 12, and various information received from the cellular phone 100 via the narrow area wireless communication unit 13.

The display unit 15 is provided as a display device such as a liquid crystal display device, an organic electroluminescence display device. The display unit 15 displays, for example, various kinds of screen such as an operation explanation screen, various setting screens as well as information acquired from the access point 200 or from the cellular phone 100. The operation input unit 16 is provided as various switch groups, such as mechanical switches disposed around the screen of the display unit 15 and/or touch panel switches disposed on the screen of the display unit 15. The user uses each of those switches of the operation input unit 16 for performing various setting operations.

The hands-free function unit 17 is a function block offering well-known hands-free functions. For instance a sound input function collecting/modulating user voice from a microphone 17a and transmitting, as voice transmission information, modulated voice information through the narrow area communication channel to the cellular phone 100. Also, a sound output function receiving voice reception information through the narrow area communication channel from the cellular phone 100 and outputting the voice from a speaker 17b, an echo cancellation function for canceling an echo, and an information exchange function for exchanging information, such as a telephone number of a caller, with the cellular phone 100.

The narrow channel establishment unit 21 performs a process, to establish a narrow area communication channel wirelessly to a communication device, such as the cellular phone 100 brought into the vehicle compartment through the narrow area wireless communication unit 13.

The wide channel establishment unit 22 performs a process to establish a wide area communication channel wirelessly to the access point 200 existing outside of the vehicle through the wide area wireless communication unit 12.

The stop detection unit 23 detects a stop condition of the vehicle, which has the vehicular communication apparatus 10 installed therein. More practically, the stop detection unit 23 is configured to detect a parking of the vehicle as a stop condition. The stop detection unit 23 may detect a stop condition of the vehicle, when the gear of the vehicle is in a park position or a neutral position, or when the speed sensor of the vehicle detects a vehicle speed of less than or equal to a predetermined value for longer than a preset period, or when the side brake of the vehicle is operated.

When the stop detection unit 23 detects a stop condition of the vehicle, the narrow channel disconnection unit 24 performs a process to disconnect the narrow area communication channel, which has been established by the narrow channel establishment unit 21. Further, the narrow channel disconnection unit 24 performs a process to disconnect the narrow area communication channel when the user inputs a disconnection instruction for disconnecting the narrow area communication channel to the vehicular communication apparatus 10 through the operation input unit 16.

The wide channel disconnection unit 25 performs a process to disconnect the wide area communication channel, which has been established by the wide channel establishment unit 22, when communication with the access point 200 is concluded, or when the user inputs a disconnection instruction for disconnecting the wide area communication channel to the vehicular communication apparatus 10 through the operation input unit 16.

When the narrow channel establishment unit 21 establishes the narrow area communication channel to the cellular phone 100, the hands-free call placement unit 26 places a hands-free call with the cellular phone 100 through the hands-free function unit 17. Further, if the hands-free call placement unit 26 has the hands-free call through the cellular phone 100 when the stop detection unit 23 detects a stop condition of the vehicle, the narrow channel disconnection unit 24 disconnects the narrow area communication channel (i) after the hands-free call is ended or (ii) after transferring, to the cellular phone 100, call continuation information that allows the continuation of the present call. The call continuation information includes, for example, a telephone number of the caller, the voice transmission information, and the voice reception information, which are owned by the vehicular communication apparatus 10 at a time of disconnecting the narrow area communication channel. After receiving the call continuation information, the cellular phone 100 can maintain and continue, independently, the present call even when the narrow area communication channel is disconnected.

The access point detection unit 27 continuously, regularly or intermittently detects an access point 200 to which the wide channel establishment unit 22 can establish the wide area communication channel. In other words, the access point detection unit 27 continuously, regularly or intermittently detects the presence of an access point 200 within a predetermined communication area centered around the subject vehicle.

Figure 2:
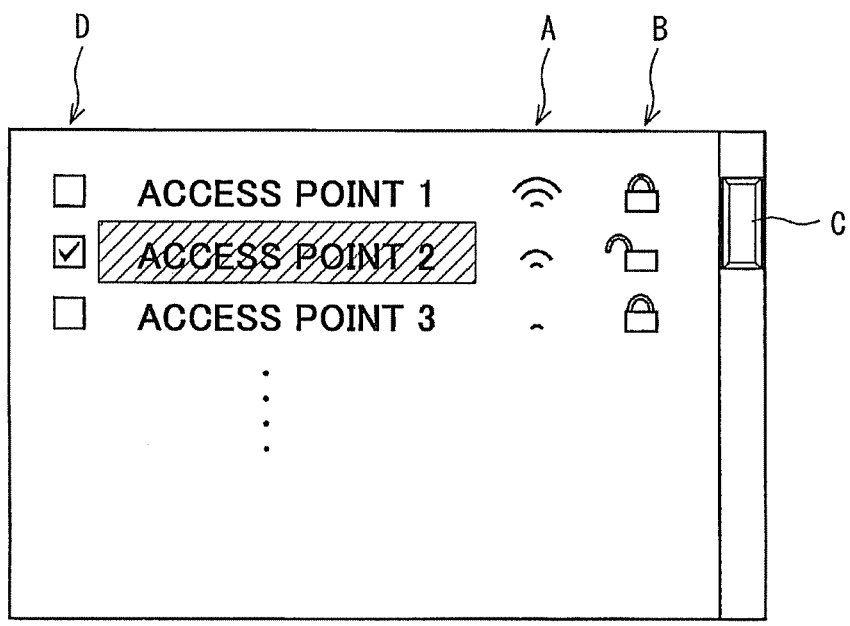
FIG. 2 is an illustration of a listing of access points.

The access point display unit 28 displays, on the display unit 15, a list of access points 200 detected by the access point detection unit 27. With reference to FIG. 2, the list of access points 200 provides, for each of the access points 200 detected, a field intensity information A and a security setting information B. The field intensity information A represents a field intensity of the access point 200, which is an accessibility or an ease of establishing the wide area communication channel. The security setting information B represents existence of security, setting. Further, a sign C is a scroll bar for scrolling the screen. Further, a check box D on the left side of each access point 200 listed is, as described later, an indicator of the selection of the access point 200 by the user, which indicates when checked that the user has selected and set the access point 200 as a priority access point 200.

The access point extraction unit 29 extracts one of the access points 200 to which a communication channel is established from the list of the access points 200 displayed on the access point display unit 28. In this case, the list of the access points 200 displayed on the access point display unit 28 is displayed as a part of the touch panel switches (e.g., each point 200 is itemized as a button on the touch panel) that are a part of the operation input unit 16. Further, when the user touches one of those buttons as a desired item, the access point extraction unit 29 extracts the access point 200 corresponding to the touched button.

The priority access point setting unit 30 sets, as a priority access point, at least one of the access points 200 detected by the access point detection unit 27, to which the establishment of the wide area communication channel is prioritized. The priority access point setting unit 30 may automatically set, as a priority access point, for example, an access point 200 to which the wide area communication channel has recently been established, or may be able to set, as a priority access point, the access point 200 that is selected as a checked item having a check mark in the check box D according to the user operation through the operation input unit 16.

Further, the access point display unit 28 displays a priority, access point in the list in a highlighted manner as shown in FIG. 2, if the detected access points 200 in the list detected by the access point detection unit 27 include a priority access point. The form of the highlighting the priority access point may be implemented in various manners. That is, for example, use of a different background color for the priority access point, blinking of the priority access point, use of bold typeface for the name of the priority access point, or the like may be adopted.

Figure 3:
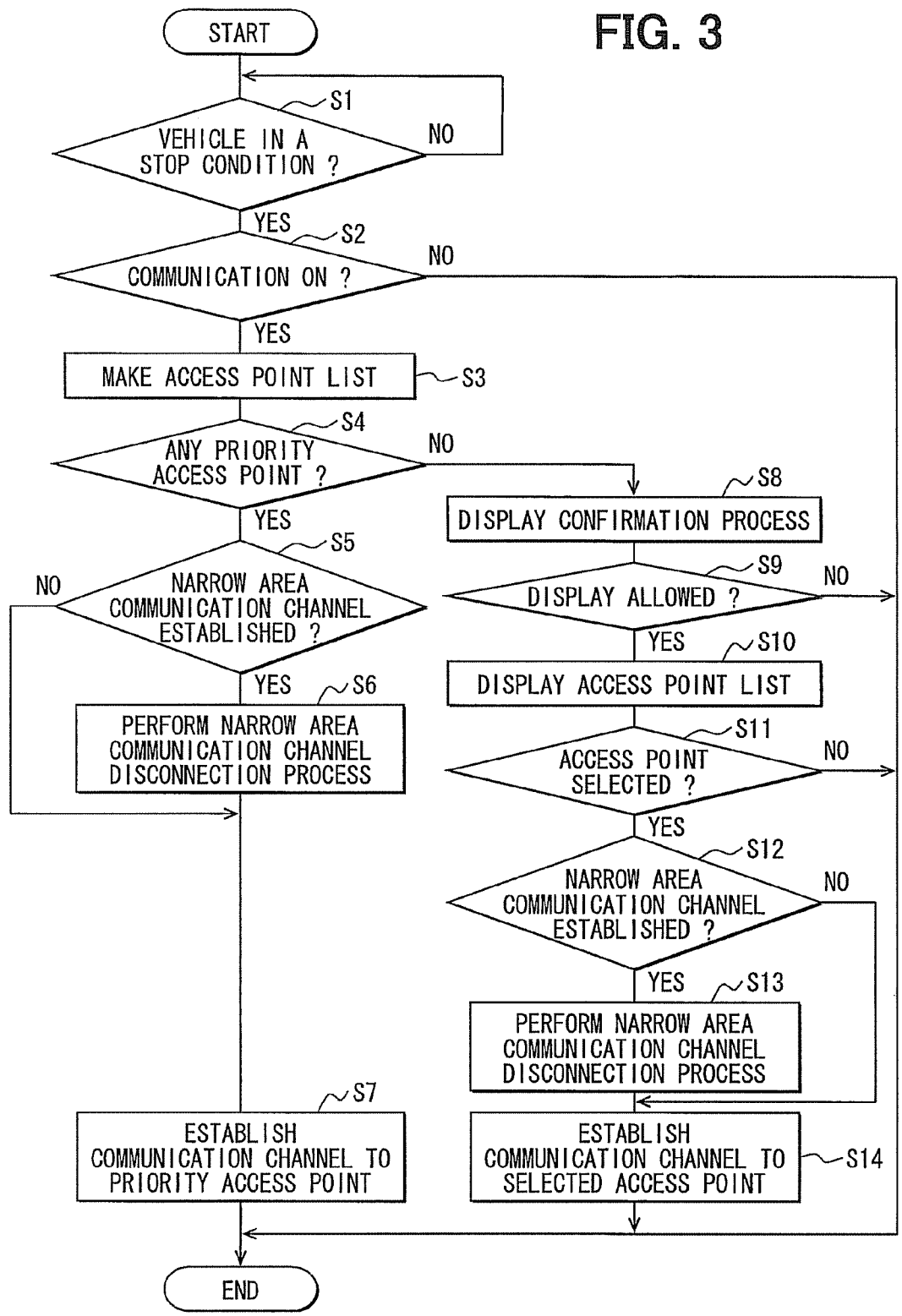
FIG. 3 is a flowchart of an operation of the vehicular communication apparatus.

The operation of the vehicular communication apparatus 10 described above is described in more detail in the following, with reference to a flowchart in FIG. 3.

The control unit 11 of the vehicular communication apparatus 10, in S1, monitors whether the vehicle having the vehicular communication apparatus 10 is in a stop condition, such as being in park gear. Upon detecting that the vehicle is in the stop condition (S1:YES), the control unit 11, in S2, determines whether the communication function is turned "On".

When the communication function is turned "Off" (S2: NO), the control unit 11 concludes the process. On the other hand, when the communication function is turned "On" (S2: YES), the control unit 11, in S3, makes a list of the access points 200 detected by the access point detection unit 27 within a predetermined period of time, such as 5 seconds, from the detection of the stop condition of the vehicle. The control unit 11, in S4, then determines whether a priority access point is included in the list of the access points 200 detected.

When a priority access point is included in the list of the access points 200 (S4:YES), the control unit 11, in S5, determines whether a narrow area communication channel is wirelessly established to a communication device such as a cellular phone 100.

When the narrow area communication channel is wirelessly established to a communication device (S5:YES), the control unit 11, in S6, performs the narrow area communication channel disconnection process to disconnect the narrow area communication channel concerned. The control unit 11, in S7, establishes the wide area communication channel wirelessly to the priority access point included in the list of the access points 200 (S7), and concludes the process.

On the other hand, when the narrow area communication channel is not wirelessly established to the communication device (S5: NO), the control unit 11, in S7, establishes the wide area communication channel wirelessly to the priority access point included in the list of the access points 200, and then the process is concluded. In other words, the narrow area communication channel disconnection process (S6) is not performed.

When the priority access point is not included in the list of the access points 200 (S4:NO), the control unit 11, in S8, performs a display confirmation process. In the display confirmation process, the control unit 11 displays, for example, an OK button (not illustrated), for allowing the display of the access point list and an NG button (not illustrated) for not allowing the display of the access point list, together with a prompt message "Would you like to display a list of access points to which a communication channel can be established?"

When the OK button is operated (S9:YES), the control unit, in S10, displays the list of the access points 200 on the display unit 15. On the other hand, when the NG button is operated (S9:NO), the process concludes.

When the control unit 11 displays the list of the access points 200 in S10, it determines, in S11, whether one of the access points 200 listed is selected from the list. When one of the access points 200 listed is selected (S11:YES), the control unit 11, in S12, determines whether the narrow area communication channel is wirelessly established to the communication device, such as the cellular phone 100.

When the narrow area communication channel is wirelessly established to the communication device (S12:YES), the control unit 11, in S13, performs the narrow area communication channel disconnection process to disconnect the narrow area communication channel concerned. The control unit 11, in S14, establishes a wide area communication channel to the access point 200 selected, and concludes the process.

On the other hand, when the narrow area communication channel is not established wirelessly to the communication device (S12:NO), the control unit 11, in S14, establishes a wide area communication channel to the access point 200 selected, without performing the narrow area communication channel disconnection process of S13, and concludes the process.

Further, when none of the access points 200 listed is chosen (S11:NO), the control unit 11 concludes the process without establishing a wide area communication channel to any one of the access points 200.

As described above, the present embodiment of the disclosure is in regards to the disconnection of the narrow area communication channel, which has been established by the narrow channel establishment unit 21, by using the narrow channel disconnection unit 24, when the stop detection unit 23 detects a stop condition of the vehicle, such as a parking of the vehicle.

According to such a configuration, during the stop condition of the vehicle, such as a certain period of continuous time of parking of the vehicle that allows efficient communication with the access point 200 through the wide area communication channel, the narrow area communication channel established to a communication device, such as a cellular phone 100, is disconnected, thereby preventing a deterioration of the throughput of the wide area communication channel due to the communication operation of the narrow area communication channel.

Further, according to the present embodiment, a process to establish the wide area communication channel to the access point 200 existing outside of the vehicle and a process to prevent a deterioration of the throughput of the wide area communication channel by disconnecting the narrow area communication channel can both be performed during the stop condition of the vehicle for a period of time that is determined to be relatively long and continuous. In addition, when the vehicle stops temporary, such as at a traffic light or the like, that is, when the communication with the access point 200 through the wide area communication channel is not required, an unnecessary disconnection of the narrow area communication channel is prevented.

Further, according to the present embodiment, the vehicular communication apparatus 10 includes a function to perform a hands-free call, or a so-called hands-free call function, with the cellular phone 100 when the communication device to be used is the cellular phone 100. Furthermore, the vehicular communication apparatus 10 disconnects, the narrow area communication channel by the narrow channel disconnection unit 24 (i) after the hands-free call has ended when a hands-free call with the cellular phone 100 by the hands-free call placement unit 26 is performed during a stop condition of the vehicle detected by the stop detection unit 23, or (ii) after transferring the call continuation information to the cellular phone 100.

In other words, even when the stop condition of the vehicle is detected, the vehicular communication apparatus 10 will not disconnect the narrow area communication channel until after confirming the end of the hands-free call or after enabling the cellular phone 100 to continue the call. In such manner, the disconnection of the narrow area communication channel immediately after the stop of the vehicle is prevented, thereby improving the usability of the vehicular communication apparatus 10.

By displaying a message such as "Would you like to display a list of access points to which a communication channel can be established?" or a message such as "Would you like to continue the call by using a cellular phone?" on the display unit 15, the vehicular communication apparatus 10 may be configured to display an OK button for allowing the display of the access point list and an NG button for not allowing the display of such list, for responding to the message displayed. The vehicular communication apparatus 10 may then maintain the narrow area communication channel until the end of the hands-free call or until the continuation of the call by using the cellular phone 100 when the OK button is operated. The vehicular communication apparatus 10 may also immediately disconnect the narrow area communication channel when the NG button is operated.

Communication with an access point that exists outside of the vehicle, that is, communication with the access point through the wide area communication channel is efficiently performed when a vehicle is continuously stopping for a relatively, long time, but not when a vehicle is temporarily approaching the access point or not when a vehicle is temporarily stopping. Therefore, in the present embodiment, by taking into account that the efficient communication through the wide area communication channel may be highly possibly performed at a time of continuous stopping of the vehicle for a certain period of time, the narrow area communication channel which is different from the wide area communication channel is disconnected at such a time of continuous stopping of the vehicle for a certain period of time, for facilitating the communication through the wide area communication channel, that is, for preventing the throughput deterioration of the wide area communication channel.

Although the present disclosure has been fully described in connection with the preferred embodiment thereof with reference to the accompanying drawings, it is to be noted that various changes and modifications will become apparent to those skilled in the art.

For instance, the narrow area communication channel disconnection process of S6/S13 may be configured to be performed by the control unit 11 of the vehicular communication apparatus 10 after the confirmation of intention of disconnection by the user. For example, the control unit 11 may display a message "Disconnect the narrow area communication channel?" on the display unit 15, together with an OK/NG button. Upon detecting the operation of the OK button, disconnection of the narrow area communication channel is performed by the control unit 11, or, upon detecting the operation of the NG button, the narrow area communication channel is maintained without disconnecting the narrow area communication channel.

When a stop state of the vehicle has ended after having disconnected the narrow area communication channel which was established due to the stop of the vehicle, the vehicular communication apparatus 10 may be configured to automatically re-establish a narrow area communication channel to the cellular phone 100. In such a case, the vehicular communication apparatus 10 may be configured to automatically disconnect the wide area communication channel established to the access point 200 by using the wide channel disconnection unit 25, when the narrow area communication channel has been re-established.

According to such a configuration, the throughput deterioration of the narrow area communication channel due to the communication operation of the wide area communication channel is prevented.

The vehicular communication apparatus 10 may be installed in the vehicle as a part of a vehicular device such as a navigation apparatus, for example, or may be installed in the vehicle disposed separately from such a vehicular device.

Such changes and modifications are to be understood as being within the scope of the present disclosure as defined by the appended claims.

What is claimed is:

1. A vehicular communication apparatus comprising:
   a narrow area communication channel establishing unit for establishing a narrow area communication channel to a communication device brought into a vehicle compartment of a vehicle;
   a wide area communication channel establishing unit for establishing a wide area communication channel to an access point outside of the vehicle;
   a stop detection unit for detecting a stop condition of the vehicle, and
   a narrow area communication channel disconnection unit for disconnecting the narrow area communication channel having been established by the narrow area communication channel establishing unit, wherein
   when the stop detection unit detects the stop condition of the vehicle, the narrow area communication channel disconnection unit disconnects the narrow area communication channel and the wide area communication channel establishing unit establishes a wide area communication channel to the access point outside of the vehicle.

2. The vehicular communication apparatus of claim 1, wherein the stop detection unit detects the stop condition of the vehicle when the vehicle is parked.

3. The vehicular communication apparatus of claim 1 further comprising:
   a hands-free call placement unit for placing a hands-free call through a cellular phone when (i) the communication device is the cellular phone and (ii) the narrow area communication channel establishing unit establishes a narrow area communication channel to the cellular phone, wherein,
   the narrow area communication channel disconnection unit disconnects the narrow area communication channel after one of (i) ending the hands-free call and (ii) transferring, to the cellular phone, call continuation information that is required for continuation of the call, when the hands-free call placement unit is having a hands-free call at a time of detecting the stop condition of the vehicle by the stop detection unit.

4. The vehicular communication apparatus of claim 1, wherein the stop determination unit detects any stop condition of the vehicle.

5. The vehicular communication apparatus of claim 1, wherein the stop detection unit detects the stop condition of the vehicle regardless of a stop condition of an engine of a vehicle.

6. The vehicular communication apparatus of claim 1, wherein when a stop condition of the vehicle has ended, the narrow area communication channel disconnection unit reconnects the narrow area communication channel.

* * * * *